United States Patent
Levit et al.

(10) Patent No.: US 10,497,367 B2
(45) Date of Patent: *Dec. 3, 2019

(54) FLEXIBLE SCHEMA FOR LANGUAGE MODEL CUSTOMIZATION

(71) Applicant: Microsoft Technology Licensing, LLC, Redmond, WA (US)

(72) Inventors: Michael Levit, San Jose, CA (US); Hernan Guelman, San Carlos, CA (US); Shuangyu Chang, Fremont, CA (US); Sarangarajan Parthasarathy, Mountain View, CA (US); Benoit Dumoulin, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,088

(22) Filed: Dec. 22, 2016

(65) Prior Publication Data

US 2017/0103753 A1    Apr. 13, 2017

Related U.S. Application Data

(63) Continuation of application No. 14/227,492, filed on Mar. 27, 2014, now Pat. No. 9,529,794.

(51) Int. Cl.
*G10L 15/02* (2006.01)
*G10L 15/183* (2013.01)
(Continued)

(52) U.S. Cl.
CPC ........ *G10L 15/183* (2013.01); *G06F 17/2755* (2013.01); *G06F 17/2785* (2013.01); *G10L 15/30* (2013.01)

(58) Field of Classification Search
USPC ................... 704/10, 243–250, 257, 265, 275
See application file for complete search history.

(56) References Cited

U.S. PATENT DOCUMENTS 5,170,499 A   12/1992  Grothause
5,233,681 A    8/1993  Bahl
(Continued)

FOREIGN PATENT DOCUMENTS

CN    1622646    6/2005
CN    1830025    9/2006
(Continued)

OTHER PUBLICATIONS

"Integrated Development Environments for Natural Language Processing", Published on: Oct. 2001, Available at: http://www.textanalysis.com/TAI-IDE-WP.pdf; 13 pgs.
(Continued)

*Primary Examiner* — Marcellus J Augustin

(57) ABSTRACT

The customization of language modeling components for speech recognition is provided. A list of language modeling components may be made available by a computing device. A hint may then be sent to a recognition service provider for combining the multiple language modeling components from the list. The hint may be based on a number of different domains. A customized combination of the language modeling components based on the hint may then be received from the recognition service provider.

20 Claims, 8 Drawing Sheets

(51) Int. Cl.
  *G06F 17/27*   (2006.01)
  *G10L 15/30*   (2013.01)

(56)            References Cited

U.S. PATENT DOCUMENTS

| | | | |
|---|---|---|---|
| 6,167,377 | A | 12/2000 | Gillick et al. |
| 6,185,528 | B1 | 2/2001 | Fissore et al. |
| 6,263,308 | B1 | 7/2001 | Heckerman |
| 6,405,132 | B1 | 6/2002 | Breed et al. |
| 6,970,947 | B2 | 11/2005 | Ebling et al. |
| 7,505,772 | B2 | 3/2009 | Himmelstein |
| 7,729,902 | B1 | 6/2010 | Gupta |
| 7,788,602 | B2 | 8/2010 | Reynar et al. |
| 7,835,910 | B1 | 11/2010 | Hakkani-Tur et al. |
| 8,015,006 | B2 | 9/2011 | Kennewick et al. |
| 8,229,729 | B2 | 7/2012 | Sarikaya et al. |
| 8,275,615 | B2 | 9/2012 | Kozat |
| 8,296,107 | B2 | 10/2012 | Turner et al. |
| 8,301,757 | B2 | 10/2012 | Catlin et al. |
| 8,315,597 | B2 | 11/2012 | Olincy et al. |
| 8,321,220 | B1 | 11/2012 | Chotimongkol et al. |
| 8,326,634 | B2 | 12/2012 | Di Cristo et al. |
| 8,346,563 | B1 | 1/2013 | Hjelm et al. |
| 8,352,245 | B1 | 1/2013 | Lloyd |
| 8,400,332 | B2 | 3/2013 | Szwabowski et al. |
| 8,412,521 | B2 | 4/2013 | Mathias et al. |
| 8,447,608 | B1* | 5/2013 | Chang ................. G10L 15/197 704/257 |
| 8,527,276 | B1 | 9/2013 | Senior et al. |
| 8,571,866 | B2 | 10/2013 | Melamed et al. |
| 8,620,659 | B2 | 12/2013 | Di Cristo et al. |
| 8,838,457 | B2* | 9/2014 | Cerra ................. G10L 15/183 704/275 |
| 9,324,323 | B1 | 8/2016 | Bikel et al. |
| 9,424,840 | B1 | 8/2016 | Hart et al. |
| 9,529,794 | B2 | 12/2016 | Levit et al. |
| 2002/0083041 | A1 | 6/2002 | Achlioptas |
| 2002/0116171 | A1 | 8/2002 | Russell |
| 2003/0125948 | A1 | 7/2003 | Lyudovyk |
| 2003/0212543 | A1 | 11/2003 | Epstein |
| 2003/0212544 | A1 | 11/2003 | Acero |
| 2004/0088726 | A1 | 8/2004 | Ma et al. |
| 2004/0176083 | A1 | 9/2004 | Shiao |
| 2005/0065789 | A1 | 3/2005 | Yacoub |
| 2005/0091057 | A1 | 4/2005 | Mark et al. |
| 2005/0144013 | A1 | 6/2005 | Fujimoto et al. |
| 2005/0165598 | A1 | 7/2005 | Cote et al. |
| 2005/0234727 | A1 | 10/2005 | Chiu |
| 2006/0036444 | A1 | 2/2006 | Hwang |
| 2006/0287856 | A1 | 12/2006 | He et al. |
| 2007/0038436 | A1 | 2/2007 | Cristo et al. |
| 2007/0128979 | A1 | 6/2007 | Shackelford |
| 2007/0150428 | A1 | 6/2007 | Webb |
| 2007/0156392 | A1 | 7/2007 | Balchandran et al. |
| 2007/0203863 | A1 | 8/2007 | Gupta |
| 2007/0226649 | A1 | 9/2007 | Agmon |
| 2007/0271086 | A1 | 11/2007 | Peters et al. |
| 2007/0275697 | A1 | 11/2007 | Aminzadeh |
| 2007/0288404 | A1 | 12/2007 | Kacmarcik |
| 2008/0004877 | A1 | 1/2008 | Tian |
| 2008/0195388 | A1 | 8/2008 | Bower et al. |
| 2008/0215183 | A1 | 9/2008 | Chen |
| 2008/0235017 | A1 | 9/2008 | Satomura |
| 2009/0030697 | A1 | 1/2009 | Cerra et al. |
| 2009/0292687 | A1 | 11/2009 | Fan |
| 2010/0004930 | A1 | 1/2010 | Strope |
| 2010/0106500 | A1 | 4/2010 | McKee |
| 2010/0114890 | A1 | 5/2010 | Hagar |
| 2010/0128863 | A1 | 5/2010 | Krum et al. |
| 2010/0211695 | A1 | 8/2010 | Steinmetz et al. |
| 2010/0267345 | A1 | 10/2010 | Berton |
| 2010/0312546 | A1 | 12/2010 | Chang et al. |
| 2011/0010171 | A1 | 1/2011 | Talwar et al. |
| 2011/0093459 | A1 | 4/2011 | Dong et al. |
| 2011/0144999 | A1 | 6/2011 | Jang et al. |
| 2011/0153324 | A1 | 6/2011 | Ballinger et al. |
| 2011/0296374 | A1* | 12/2011 | Wu ..................... G06F 17/2715 717/104 |
| 2012/0058756 | A1 | 3/2012 | Olincy |
| 2012/0065976 | A1 | 3/2012 | Deng |
| 2012/0084086 | A1 | 4/2012 | Gilbert |
| 2012/0232885 | A1 | 9/2012 | Barbosa et al. |
| 2012/0245944 | A1 | 9/2012 | Gruber |
| 2012/0253799 | A1* | 10/2012 | Bangalore ............ G10L 15/183 704/231 |
| 2012/0253802 | A1 | 10/2012 | Heck et al. |
| 2012/0254086 | A1 | 10/2012 | Deng |
| 2012/0254227 | A1 | 10/2012 | Heck |
| 2012/0265531 | A1 | 10/2012 | Bennett |
| 2012/0271617 | A1 | 10/2012 | Nakajima et al. |
| 2012/0290293 | A1 | 11/2012 | Hakkani-Tur et al. |
| 2012/0303565 | A1 | 11/2012 | Deng et al. |
| 2013/0031476 | A1 | 1/2013 | Coin et al. |
| 2013/0127614 | A1 | 2/2013 | Velusamy |
| 2013/0085756 | A1 | 4/2013 | Chotimongkol et al. |
| 2013/0138436 | A1 | 5/2013 | Yu |
| 2013/0152092 | A1 | 6/2013 | Yadgar |
| 2013/0163860 | A1 | 6/2013 | Suzuki et al. |
| 2013/0185065 | A1 | 7/2013 | Tzirkel-Hancock et al. |
| 2013/0317822 | A1 | 11/2013 | Koshinaka |
| 2013/0325148 | A1 | 12/2013 | Mustafa et al. |
| 2014/0025380 | A1 | 1/2014 | Koch et al. |
| 2014/0163959 | A1 | 6/2014 | Hebert et al. |
| 2014/0214410 | A1 | 7/2014 | Jang |
| 2014/0228007 | A1 | 8/2014 | Velusamy |
| 2014/0257803 | A1 | 9/2014 | Yu et al. |
| 2014/0358537 | A1 | 12/2014 | Gilbert |
| 2014/0372112 | A1 | 12/2014 | Xue et al. |
| 2014/0379326 | A1 | 12/2014 | Sarikaya et al. |
| 2014/0379353 | A1 | 12/2014 | Boies et al. |
| 2015/0100312 | A1 | 4/2015 | Bocchieri |
| 2015/0161993 | A1 | 6/2015 | Sainath |
| 2015/0161994 | A1 | 6/2015 | Tang |
| 2015/0170020 | A1 | 6/2015 | Garimella |
| 2015/0255061 | A1 | 9/2015 | Xue et al. |
| 2015/0255069 | A1 | 9/2015 | Adams |
| 2015/0278191 | A1 | 10/2015 | Levit et al. |
| 2015/0310858 | A1 | 10/2015 | Li et al. |
| 2015/0325236 | A1 | 11/2015 | Levit et al. |
| 2016/0203125 | A1 | 7/2016 | Sarikaya et al. |
| 2016/0325236 | A1 | 11/2016 | Lee et al. |
| 2017/0162201 | A1 | 6/2017 | Boies et al. |
| 2017/0255612 | A1 | 9/2017 | Sarikaya et al. |
| 2017/0337918 | A1 | 11/2017 | Xue et al. |

FOREIGN PATENT DOCUMENTS

| | | |
|---|---|---|
| CN | 101415039 | 4/2009 |
| CN | 102609264 | 7/2012 |
| CN | 102737099 | 10/2012 |
| CN | 102792320 | 11/2012 |
| CN | 103049792 A | 4/2013 |
| CN | 103400577 A | 11/2013 |
| CN | 103456299 A | 12/2013 |
| EP | 0553101 | 7/1997 |
| EP | 2575128 | 4/2013 |
| EP | 2619713 A1 | 7/2013 |
| JP | H01312196 A | 12/1989 |
| JP | 2002/091477 | 3/2002 |
| JP | 2003280683 A | 10/2003 |
| JP | 2004227468 A | 8/2004 |
| JP | 2005266192 A | 9/2005 |
| JP | 2007264128 A | 10/2007 |
| JP | 2009075582 A | 4/2009 |
| JP | 2009230068 A | 10/2009 |
| JP | 2012075047 A | 4/2012 |
| JP | 2012118668 A | 6/2012 |
| JP | 2012128440 A | 7/2012 |
| KR | 20130022513 | 3/2013 |
| KR | 20140108609 A | 9/2014 |
| RU | 2187902 C2 | 8/2002 |
| RU | 2004123352 A | 1/2006 |
| RU | 2011122784 | 12/2012 |
| WO | WO 2005/013262 | 2/2005 |

(56) References Cited

FOREIGN PATENT DOCUMENTS

| WO | 2008081543 A1 | 7/2008 |
|---|---|---|
| WO | 2010051654 A1 | 5/2010 |
| WO | 2013149123 A1 | 10/2013 |
| WO | WO 2013/171481 | 11/2013 |

OTHER PUBLICATIONS

Abad, et al., "Context Dependent Modelling Approaches for Hybrid Speech Recognizers", In Proceeding of INTERSPEECH, Sep. 26, 2010, 4 pages.
Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.
Abid, et al., "A New Neural Network Pruning Method Based on the Singular Value Decomposition and the Weight Initialisation", In Proceedings of 11th European Signal Processing Conference, Sep. 3, 2002, 4 pages.
Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.
Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Chandrasekaran et al., "Sparse and Low-Rank Matrix Decompositions"; IFAC Symposium on System Identification, 2009; 6 pgs.
Chen, Wei, "Building Language Model on Continuous Space using Gaussian Mixture Models", In Proceedings of Research in Language Modeling, Jan. 2007, 66 pages.
Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.
Dahl, et al., "Large Vocabulary Continuous Speech Recognition with Context-Dependent DBN-HMMs", In IEEE International Conference on Acoustics, Speech and Signal Processing, May 22, 2011, 4 pages.
Davis, et al., "Low-Rank Approximations for Conditional Feedforward Computation in Deep Neural Networks", In Proceedings of ArXiv preprint arXiv:1312.4461, Dec. 2013, 9 pages.
Deng et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
Dos Reis Mota, Pedro Jose, "LUP: A Language Understanding Platform", A Dissertation for the Degree of Master of Information Systems and Computer Engineering, Jul. 2012, 128 pages.
Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.
European Official Communication in Application 14736140.6, dated Jan. 28, 2016, 2 pgs.
European Official Communication in Application 14736143.0, dated Feb. 2, 2016, 2 pgs.
Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.
Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
He et al; "What is Discriminative Learning"; Achorn International; Jun. 25, 2008; 25 pgs.
Heck et al.; "Robustness to Telephone Handset Distortion in Speaker Recognition by Discriminative Feature Design"; In Journal of Speech Communication—Speaker Recognition and its Commercial and Forensic Applications, vol. 31, Issue 2-3; Jun. 2000; http://rmcet.com/lib/E-Journals/Speech%20Communication/1-s2.0-S0167639399000771-main.pdf; 12 pgs.
Hinton, et al., "Deep Neural Networks for Acoustic Modeling in Speech Recognition", In IEEE Signal Processing Magazine, vol. 29, Issue 6, Nov. 2012, 27 pages.
Hoffmeister et al., "Log-Linear Model Combination with Word-Dependent Scaling Factors"; Human Language Technology and Pattern Recognition Computer Science Department; Sep. 6-10; Brighton UK; Copyright © 2009 ISCA; 4 pgs.
Huang et al., "Unified Stochastic Engine (USE) for Speech Recognition"; School of Computer Science; 1993 IEEE; 4 pgs.
Jaitly, et al., "An Application of Pretrained Deep Neural Networks to Large Vocabulary Conversational Speech Recognition", In Proceedings of 13th Annual Conference of the International Speech Communication Association, Mar. 12, 2012, 11 pages.
Keshtkar et al., "A Corpus-based Method for Extracting Paraphrases of Emotion Terms"; Proceedings of the NAACL HLT 2010 Workshop on Computational Appraoches to Analysis and Generation of Emotion in Text; Jun. 2010; 10 pgs.
Ko, et al., "Cammia—A Context-Aware Spoken Dialog System for Mobile Environments", In Automatic Speech Recognition and Understanding Workshop, Jul. 29, 2011, 2 pages.
Konig et al., "Nonlinear Discriminant Feature Extraction for Robust Text-Independent Speaker Recognition"; In Proceeding of the RLA2C, ESCA workshop on Speaker Recognition and its Commercial and Forensic Applications; Apr. 1998; http://www.msr-waypoint.com/pubs/193653/konig_heck_DNN.pdf; 4 pgs.
Lecouteux et al., "Dynamic Combination of Automatic Speech Recognition Systems by Driven Decoding"; In Journal of IEEE Transactions on Audio, Speech and Language Processing; Jan. 2013; http://hal.archives-ouvertes.fr/docs/00/75/86/26/PDF/SystemCombination.pdf; 10 pgs.
Lee, et al., "Intention-Based Corrective Feedback Generation using Context-Aware Model", In Proceedings of the Second International Conference on Computer Supported Education, Apr. 7, 2010, 8 pages.
Li et al., "Lattice Combination for Improved Speech Recognition"; In Proceedings of the 7th International Conference of Spoken Language Processing; Sep. 16, 2002; http://www.cs.cmu.edu/afs/cs/user/robust/www/Papers/icslp02_xiang.pdf; 4 pgs.
Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, 4 pages.
Liao, Hank, "Speaker Adaptation of Context Dependent Deep Neural Networks", In IEEE International Conference on Acoustics, Speech and Signal Processing, May 26, 2013, 5 pages.
Lilly, et al., "Robust Speech Recognition Using Singular Value Decomposition Based Speech Enhancement," IEEE TENCON, 1997, 4 pgs.
Liu, et al., "Language Model Combination and Adaptation using Weighted Finite State Transducers", In Proceedings of IEEE International Conference on Acoustics Speech and Signal Processing, Mar. 14, 2010, 4 pages.
Liu, et al., "Use of Contexts in Language Model Interpolation and Adaptation", In Journal of Computer Speech and Language vol. 27 Issue 1, Feb. 2009, 23 pages.
Meinedo et al., "Combination of Acoustic Models in Continuous Speech Recognition Hybrid Systems"; In Proceedings of Sixth International Conference on Spoken Language Processing; Oct. 2000; http://www.inesc-id.pt/pt/indicadores/Ficheiros/416.pdf; 4 pgs.
Mohamed, et al., "Acoustic Modeling Using Deep Belief Networks", In IEEE Transactions on Audio, Speech, and Language Processing, vol. 20, Issue 1, Jan. 2012, 10 pages.
Moreira, et al., "Towards the Rapid Development of a Natural Language Understanding Module", In Proceedings of the 10th International Conference on Intelligent Virtual Agents, Jan. 2011, 7 pages.

(56) References Cited

OTHER PUBLICATIONS

Motlicek et al., "Feature and Score Level Combination of Subspace Gaussinasin LVCSR Task"; In IEEE International Conference on Acoustics, Speech and Signal Processing; May 26, 2013; http://ieeexplore.ieee.org/stamp/stamp.jsp?tp=&arnumber=6639142; 5 pgs.
Notice of Allowance dated Dec. 15, 2015 in U.S. Appl. No. 13/923,917, 11 pgs.
Notice of Allowance dated Dec. 18, 2015 in U.S. Appl. No. 14/201,704, 15 pgs.
Notice of Allowance dated Mar. 4, 2016 in U.S. Appl. No. 13/923,917, 28 pgs.
Notice of Allowance dated Nov. 30, 2015 in U.S. Appl. No. 13/923,969, 12 pgs.
Notice of Allowance dated Oct. 1, 2015 in U.S. Appl. No. 13/923,969, 7 pgs.
Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.
PCT 2nd Written Opinion in International Application PCT/US2015/029334, dated Mar. 31, 2016, 5 pgs.
PCT International Search Report and Written Opinion Issued in PCT Application No. PCT/US2014/041014, dated Oct. 2, 2014, 9 pages.
PCT International Search Report and Written Opinion Issued in PCT Application No. PCT/US2014/041023, dated Jun. 3, 2015, 17 Pages.
PCT International Search Report and Written Opinion Issued in PCT Application No. PCT/US2015/017872, dated Jun. 25, 2015, 11 Pages.
PCT International Search Report and Written Opinion Issued in PCT Application No. PCT/US2015/021921, dated Jul. 17, 2015, 11 Pages.
PCT International Search Report and Written Opinion Issued in PCT Application No. PCT/US2015/029334, dated Jul. 7, 2015, 12 Pages.
PCT Preliminary Report on Patentability dated Dec. 14, 2015 in Appln No. PCT/US2015/017872, 7 pgs.
PCT Preliminary Report on Patentability dated Nov. 13, 2015 in Appln No. PCT/US2014/041023, 7 pgs.
PCT Preliminary Report on Patentability dated Sep. 15, 2015 in Appln No. PCT/US2014/041014, 6 pgs.
PCT Written Opinion dated Feb. 11, 2016 in Appln No. PCT/US2015/021921, 7 pgs.
Response dated Aug. 6, 2015 in U.S. Appl. No. 13/923,969, 7 pgs.
Response dated Aug. 7, 2015 in U.S. Appl. No. 13/923,917, 10 pgs.
Response dated May 21, 2015 in U.S. Appl. No. 13/920,323, 15 pgs.
Sainath, et al., "Auto-Encoder Bottleneck Features Using Deep Belief Networks", In Proceedings of IEEE International Conference on Acoustics, Speech and Signal Processing, Mar. 25, 2012, 4 pages.
Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.
Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.
Saluja, et al., "Context-aware Language Modeling for Conversational Speech Translation", In Proceedings of Machine Translation Summit XIII, Sep. 19, 2011, 8 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs.
Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Seide, et al., "Conversational Speech Transcription using Context-Dependent Deep Neural Networks", In Proceeding of 12th Annual Conference of the International Speech Communication Association, Aug. 28, 2011, 4 pages.
Seneff, et al., "Galaxy-II: A Reference Architecture for Conversational System Development", In Proceedings of the 5th International Conference on Spoken Language Processing, Nov. 2008, 4 pages.
Sing, et al., "Domain Metric Knowledge Model for Embodied Conversation Agents", In 5th International Conference on Research, Innovation & Vision for the Future, Mar. 5, 2007, 7 pages.
Singh-Miller et al., "Dimensionality Reduction for Speech Recognition Using Neighborhood Components Analysis"; In Proceedings of 8th Annual Conference of the International Speech Communication Association, Antwerp; Dec. 27, 2007; http://www.cs.columbia.edu/~mcollins/papers/icslp07.pdf; 4 pgs.
Siniscalchi, et al., "Hermitian Based Hidden Activation Functions for Adaptation of Hybrid HMM/ANN Models", In Proceedings of 13th Annual Conference of the International Speech Communication Association, Sep. 9, 2012, 4 pages.
Su et al., "Error Back Propagation for Sequence Training of Context-Dependent Deep Networks for Conversational Speech Transcription"; In IEEE International Conference on Acoustics, Speech, and Signal Processing; May 26, 2013; http://research.microsoft.com/pubs/194345/0006664.pdf; 5 pgs.
Swietojanski et al., "Revisiting Hybrid and GMM-HMM System Combination Techniques"; In Proceeding of the IEEE International Conference on Acoustics, Speech and Signal Processing; May 26, 2013; http://homepages.inf.ed.ac.uk/s1136550/data/Swietojanski_ICASSP2013.pdf; 5 pgs.
Trmal, et al., "Adaptation of a Feedforward Artificial Neural Network Using a Linear Transform", In Proceedings of in Text, Speech and Dialogue, Sep. 10, 2010, 8 pgs.
U.S. Appl. No. 13/920,323, filed Jun. 18, 2013, entitled "Restructuring Deep Neural Network Acoustic Models".
U.S. Appl. No. 13/923,917, filed Jun. 21, 2013, entitled "Environmentally Aware Dialog Policies and Response Generation".
U.S. Appl. No. 13/923,969, filed Jun. 21, 2013, entitled "Building Conversational Understanding Systems Using a Toolset".
U.S. Appl. No. 14/201,704, filed Mar. 7, 2014, entitled "Low-Footprint Adaptation and Personalization for a Deep Neural Network".
U.S. Appl. No. 14/227,492, filed Mar. 27, 2014, entitled "Flexible Schema for Language Model Customization".
U.S. Appl. No. 14/265,110, filed Apr. 29, 2014, entitled "Shared Hidden Layer Combination for Speech Recognition Systems".
U.S. Appl. No. 14/273,100, filed May 8, 2014, entitled "Context Specific Language Model Scale Factors".
U.S. Official Action dated Aug. 13, 2015 in U.S. Appl. No. 14/227,492, 37 pgs.
U.S. Official Action dated Feb. 27, 2015 in U.S. Appl. No. 13/920,323, 22 pgs.
U.S. Official Action dated Jan. 4, 2016 in U.S. Appl. No. 14/265,110, 49 pgs.
U.S. Official Action dated Jul. 1, 2015 in U.S. Appl. No. 14/201,704, 17 pgs.
U.S. Official Action dated May 28, 2015 in U.S. Appl. No. 13/923,917, 18 pgs.
U.S. Official Action dated May 6, 2015 in U.S. Appl. No. 13/923,969, 12 pgs.
U.S. Official Action dated Oct. 1, 2015 in U.S. Appl. No. 13/920,323, 34 pgs.
U.S. Official Action dated Sep. 24, 2015 in U.S. Appl. No. 13/920,323, 25 pgs.
U.S. Official Action dated Sep. 29, 2015 in U.S. Appl. No. 13/923,917, 9 pgs.
U.S. Appl. No. 13/920,323, Office Action dated Apr. 5, 2016, 23 pgs.
U.S. Appl. No. 13/923,917, Notice of Allowance dated Mar. 21, 2016, 2 pgs.
U.S. Appl. No. 13/923,969, Amendment after Allowance filed Feb. 29, 2016, 8 pgs.

(56) References Cited

OTHER PUBLICATIONS

U.S. Appl. No. 13/923,969, Notice of Allowance dated Feb. 18, 2016, 2 pgs.
U.S. Appl. No. 13/923,969, Notice of Allowance dated Mar. 9, 2016, 2 pgs.
U.S. Appl. No. 14/201,704, Amendment after Allowance filed Feb. 24, 2016, 6 pgs.
U.S. Appl. No. 14/201,704, USPTO Response dated Mar. 3, 2016, 2 pgs.
U.S. Appl. No. 14/227,492, Amendment and Response filed Jan. 13, 2016, 13 pgs.
U.S. Appl. No. 14/227,492, Notice of Allowance dated Apr. 19, 2016, 16 pgs.
U.S. Appl. No. 14/265,110, Amendment and Response filed Mar. 17, 2016, 17 pgs.
U.S. Appl. No. 14/273,100, Amendment and Response filed Jan. 4, 2016, 18 pgs.
U.S. Appl. No. 14/273,100, Amendment and Response filed Jun. 2, 2016, 12 pages.
U.S. Appl. No. 14/273,100, Office Action dated Mar. 3, 2016, 19 pgs.
U.S. Appl. No. 15/076,125, Office Action dated May 25, 2016, 13 pages.
Vanhoucke, et al., "Improving the Speed of Neural Networks on CPUs", In Proceedings of NIPS Workshop on Deep Learning and Unsupervised Feature Learning, Dec. 16, 2011, 8 pages.
Xiaodong, et al., "Discriminative Learning for Speech Recognition: Theory and Practice", In Book on Discriminative Learning for Speech Recognition: Theory and Practice, Chapter 1, Aug. 12, 2008, 25 Pages.
Xue, et al., "Restructuring of Deep Neural Network Acoustic Models with Singular Value Decomposition", In Proceedings of 14th Annual Conference of the International Speech Communication Association, Aug. 25, 2013, 5 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.
Yan et al., "A Scalable Approach to Using DSS-Derived Features in GMM-HMM Based Acoustic Modeling for LVCSR"; In Proceeding of the 14th Annual Conference of the International Speech Communication Association; Aug. 25, 2013; http://homepages.inf.ed.ac.uk/s1136550/data/Swietojanski_ICASSP2013.pdf; 5 pgs.
Yao, et al., "Adaptation of Context-Dependent Deep Neural Networks for Automatic Speech Recognition", In IEEE Spoken Language Technology Workshop, Dec. 2, 2012, 4 pages.
Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Yu, et al., "Improved Bottleneck Features Using Pretrained Deep Neural Networks", In Proceedings of 12th Annual Conference of the International Speech Communication Association, Aug. 28, 2011, 4 pages.
Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.
Yu, et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
U.S. Appl. No. 13/920,323, Amendment and Response filed Aug. 5, 2016, 23 pages.
U.S. Appl. No. 13/923,917, Office Action dated Jun. 30, 2016, 10 pages.
U.S. Appl. No. 14/227,492, Notice of Allowance dated Aug. 4, 2016, 12 pages.
U.S. Appl. No. 14/265,110, Notice of Allowance dated Aug. 3, 2016, 21 pages.
U.S. Appl. No. 15/076,125, Amendment and Response filed Oct. 14, 2016, 11 pgs.
U.S. Appl. No. 13/923,917, Amendment and Response filed Sep. 30, 2016, 8 pgs.
U.S. Appl. No. 13/923,917, Notice of Allowance dated Oct. 20, 2016, 7 pgs.
U.S. Appl. No. 14/227,492, Notice of Allowance dated Oct. 14, 2016, 8 pgs.
U.S. Appl. No. 13/920,323, Office Action dated Nov. 18, 2016, 25 pgs.
U.S. Appl. No. 15/076,125, Office Action dated Dec. 8, 2016, 6 pgs.
U.S. Appl. No. 14/227,492, Amendment and Response filed Nov. 4, 2016, 6 pgs.
U.S. Appl. No. 15/076,125, Response filed Feb. 3, 2017, 3 pgs.
U.S. Appl. No. 15/076,125, Notice of Allowance dated Feb. 21, 2017, 5 pgs.
U.S. Appl. No. 13/923,917, Notice of Allowance dated Jan. 18, 2017, 2 pgs.
U.S. Appl. No. 13/923,917, Amendment filed Jan. 20, 2017, 6 pgs.
U.S. Appl. No. 13/923,917, USPTO Response dated Feb. 1, 2017, 2 pgs.
U.S. Appl. No. 14/273,100, Office Action dated Jan. 30, 2017, 15 pgs.
U.S. Appl. No. 13/920,323, Amendment and Response dated Mar. 20, 2017, 12 pgs.
U.S. Appl. No. 13/920,323, Notice of Allowance dated Apr. 3, 2017, 9 pgs.
U.S. Appl. No. 15/076,125, Notice of Allowance dated May 15, 2017, 2 pages.
U.S. Appl. No. 15/076,125, 312 Amendment filed May 19, 2017, 3 pages.
U.S. Appl. No. 15/076,125, Response to 312 Amendment dated May 31, 2017, 2 pages.
U.S. Appl. No. 13/920,323, Amendment and Response filed Dec. 9, 2015, 14 pages.
U.S. Appl. No. 14/273,100, Amendment and Response filed Jun. 30, 2017, 14 pages.
Chinese Office Action in Application 201480035401.9, dated May 15, 2017, 17 pages.
Mexican Office Action in Application MX/a/2015/017624, dated Apr. 6, 2017, 2 pages. (No English Translation).
"Office Action Issued in European Patent Application No. 15719880.5", dated Aug. 22, 2017, 5 Pages.
"International Preliminary Report on Patentability Issued in PCT Application No. PCT/US2015/021921", dated May 12, 2016, 8 Pages.
Mexican Notice of Allowance in Application MX/a/2015/017624, dated Sep. 6, 2017, 2 page. (No english translation.).
U.S. Appl. No. 14/273,100, Office Action dated Oct. 2, 2017, 17 pages.
U.S. Appl. No. 15/438,227, Office Action dated Nov. 6, 2017, 11 pages.
U.S. Appl. No. 14/273,100, Office Action dated Mar. 14, 2018, 16 pages.
U.S. Appl. No. 15/670,819, Office Action dated Feb. 23, 2018, 16 pages.
U.S. Appl. No. 15/600,995, Office Action dated Feb. 15, 2018, 11 pages.
U.S. Appl. No. 15/438,227, Amendment and Response filed Feb. 13, 2018, 9 pages.
U.S. Appl. No. 15/438,227, Office Action dated Mar. 22, 2018, 12 pages.
U.S. Appl. No. 14/273,100, Amendment and Reponse filed Feb. 2, 2018, 13 pages.
"First Office Action and Search Report Issued in Chinese Patent Application No. 201480035400.4", dated Mar. 5, 2018, 14 Pages.
Chinese Office Action in Application 201480035401.9, dated Jan. 22, 2018, 15 pages.
U.S. Appl. No. 15/600,995, Amendment and Response filed Apr. 30, 2018, 10 pages.
Russian Office Action in Application 2015154501, dated May 3, 2018, 7 pages. (No English Translation).

(56) References Cited

OTHER PUBLICATIONS

"Non Final Office Action Issued in U.S. Appl. No. 15/438,227", dated Jun. 25, 2018, 7 Pages.
"Non Final Office Action Issued in U.S. Appl. No. 15/600,995", dated Jun. 29, 2018, 11 Pages.
"Office Action Issued in European Patent Application No. 15717284.2", dated Jul. 13, 2018, 7 Pages.
"Oral Hearing Issued in European Patent Application No. 15719880.5", Mailed Date: Apr. 10, 2018, 10 Pages.
"Office Action Issued in Japanese Patent Application No. 2016521428", dated May 31, 2018, 6 Pages.
"Second Written Opinion Issued in PCT Application No. PCT/US2014/041014", dated May 11, 2015, 5 Pages.
"International Preliminary Report on Patentability Issued in PCT Application No. PCT/US2015/029334", dated Jul. 18, 2016, 8 Pages.
"Second Office Action Issued in Chinese Patent Application No. 201480035400.4", dated Oct. 31, 2018, 5 Pages.
"Third Office Action Issued in Chinese Patent Application No. 201480035401.9", dated Jul. 27, 2018, 25 Pages.
"Office Action Issued in Russian Patent Application No. 2016138130", dated Oct. 18, 2018, 6 Pages (W/O English Translation).
"Final Office Action Issued in U.S. Appl. No. 15/600,995", dated Dec. 21, 2018, 6 Pages.
"Office Action Issued in Japanese Patent Application No. 2016-559328", dated Dec. 18, 2018, 7 Pages.
"Office Action Issued in European Patent Application No. 14736143.0", dated Jun. 12, 2019, 7 Pages.
Zhao, et al., "Paraphrasing with Search Engine Query Logs", In Proceedings of the 23rd International Conference on Computational Linguistics, Aug. 23, 2010, pp. 1317-1325.
"First Office Action and Search Report Issued in Chinese Application No. 201580016605.2", dated Mar. 22, 2019, 09 Pages.
"Office Action Issued in Australian Patent Application No. 2014281049", dated Mar. 15, 2019, 04 Pages.
"First Office Action and Search Report Issued in Chinese Application No. 201580012496.7", dated Mar. 7, 2019, 11 Pages.
"Office Action Issued in Chinese Patent Application No. 201480035401.9", dated Apr. 30, 2019, 14 Pages.
"Notice of Allowance Issued in Japanese Patent Application No. 2016-559328", dated Jul. 9, 2019, 5 Pages.
"Office Action Issued in Australian Patent Application No. 2015236417", dated Aug. 28, 2019, 3 Pages.
"Non Final Office Action Issued in U.S. Appl. No. 15/600,995", dated Aug. 1, 2019, 6 Pages.
"Office Action Issued in European Patent Application No. 14736140.6", dated Sep. 17, 2019, 05 Pages.

\* cited by examiner

FLEXIBLE SCHEMA FOR LANGUAGE MODEL CUSTOMIZATION

CROSS-REFERENCE TO RELATED APPLICATIONS

This application is a continuation of and claims priority to application Ser. No. 14/227,492, now U.S. Pat. No. 9,529,794, filed Mar. 27, 2014, titled FLEXIBLE SCHEMA FOR LANGUAGE MODEL CUSTOMIZATION, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computing devices, such as smartphones, desktops, laptops, tablets, game consoles, and the like, utilize applications which incorporate automatic speech recognition (ASR) for use over a number of different domains such as voice search and short message dictation. In order to improve the quality of speech recognition, language models (e.g., shopping, games, music, movies, etc.) are often utilized to facilitate the recognition of speech which is focused on different domains. Current drawbacks associated with the use of language models include ASR scenarios in which different domains need to be served simultaneously by a recognition service provider. In these scenarios, many potentially large language models may be required to be maintained in memory which may tax the resources of recognition service providers. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide for the customization of language modeling components for speech recognition. A list of language modeling components may be made available by a computing device. A hint may then be sent to a recognition service provider for combining the multiple language modeling components from the list. The hint may be based on a number of different domains. A customized combination of the language modeling components may then be received by the computing device based on the hint.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments provide for the customization of language modeling components for speech recognition. A list of language modeling components may be made available for a computing device. A hint may then be sent to a recognition service provider for combining the multiple language modeling components from the list. The hint may be based on one of the multiple domains. A customized combination of the language modeling components may then be received by the computing device based on the hint.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
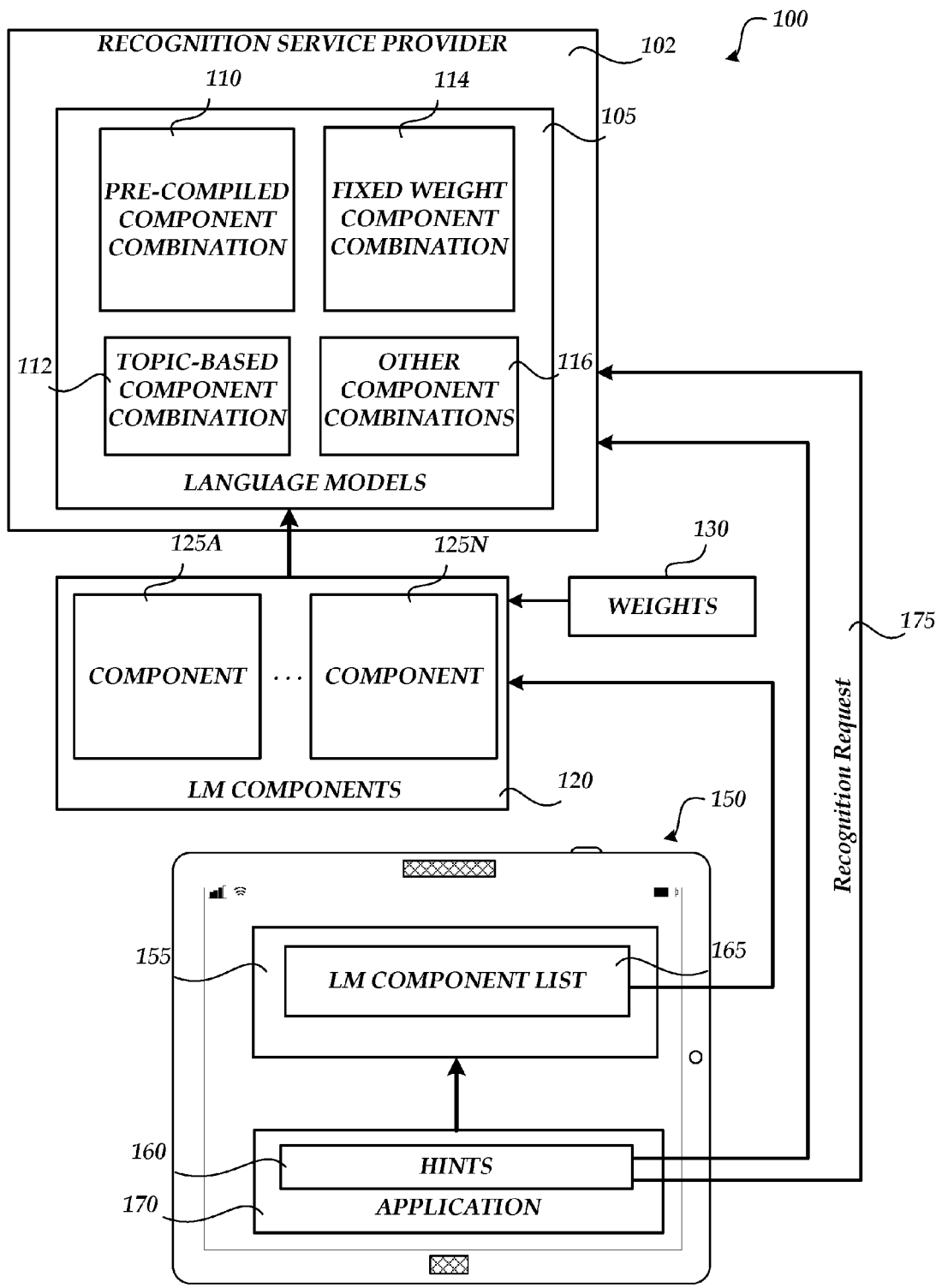
FIG. 1 is a block diagram illustrating a system for customizing language modeling components for speech recognition, in accordance with an embodiment.

Referring now to the drawings, in which like numerals represent like elements through the several figures, various aspects of the present invention will be described. FIG. 1 is a block diagram illustrating a system 100 which may be utilized for customizing language modeling components for speech recognition, in accordance with an embodiment. The system 100 may include recognition service provider 102 which may be in communication with a computing device 150 configured to receive audio and/or text input from one or more users (not shown). In one embodiment, the recognition service provider 102 may be configured for "on-the-fly" or online language model interpolation for speech recognition based on "hints" 160 (i.e., guidance) provided by application 170 executing on the computing device 150 (i.e., "hints"), towards various combinations of language modeling components tailored for specific speech recognition domains or scenarios. In particular, and as will be described in greater detail herein, the hints 160 provided by the application 170, may comprise a flexible schema for language model customization by the recognition service provider 102.

In accordance with various embodiments, the computing device 150 may comprise, without limitation, a desktop computer, laptop computer, smartphone, video game console or a television. The computing device 150 may also comprise or be in communication with one or more recording devices (not shown) used to detect speech and receive video/pictures (e.g., MICROSOFT KINECT, microphone (s), and the like). The computing device 150 may store the application 170 which may be configured to provide the hints 160 which may be utilized by the recognition service provider 102 to customize language modeling (LM) components 120. In accordance with an embodiment (and as will be described in greater detail below), the application 170 may be configured to generate a LM component list 165 including the LM components 120. In an embodiment, the LM components 120 may comprise components 125A-125N which may be utilized for speech recognition. In some embodiments, various combinations of the components 125A-125N may include or be provided with weights 130 (e.g., by an application developer), based on a particular domain, scenario or situation. For example, a language model comprising a combination of the components 125A-125N tailored towards a domain or scenario which is primarily utilized for gaming, may have the following applied weights: Games: 0.5, Movies, 0.3 and Music 0.2). Other component types (e.g., Shopping, etc.) and weight combinations are also possible.

In some embodiments, the LM components 120 may be utilized in the selection of customized component combinations (i.e., language models 105) by the recognition service provider 102 based on guidance contained in the hints 160 received from the application 170. In particular, the language models 105 may include, without limitation, a pre-compiled component combination 110, a topic-based component combination 112, a fixed weight component combination 114 and other component combinations 116. For example, the language model comprising the pre-compiled component combination 110 may be tailored towards a specific domain such as voice search of short message dictation, the language model comprising the topic-based component combination 112 may be based on a pre-compiled list of available items based on one or more topics/ styles corresponding to LM components currently available in the system 100 (e.g., Shopping, Games, Music, etc.) and the language model comprising the fixed weight component combination 114 may comprise existing fixed weight combinations of LM components (e.g., the weights 130 have been applied to the LM components) tailored towards a developer's intuition for a particular scenario.

As will be described in greater detail herein, the recognition service provider 102 may utilize the hints 160 in selecting appropriate LM component combinations for various recognition situations or scenarios. In one embodiment, the hints 160 may be submitted by the application 170 to the recognition service provider 102 as part of a recognition request 175 (i.e., for "on-the-fly") languate model interpolation. In another embodiment, the hints 160 may be submitted by the application 170 to the recognition service provider 102 as part of an offline initialization process. In accordance with an embodiment, the application 170 may comprise a speech recognition application such as the BING VOICE SEARCH, WINDOWS PHONE SHORT MESSAGE DICTATION and XBOX MARKET PLACE VOICE SEARCH applications from MICROSOFT CORPORATION of Redmond Wash. It should be understood, however, that other applications (including operating systems) from other manufacturers may alternatively be utilized in accordance with the various embodiments described herein.

Figure 2:
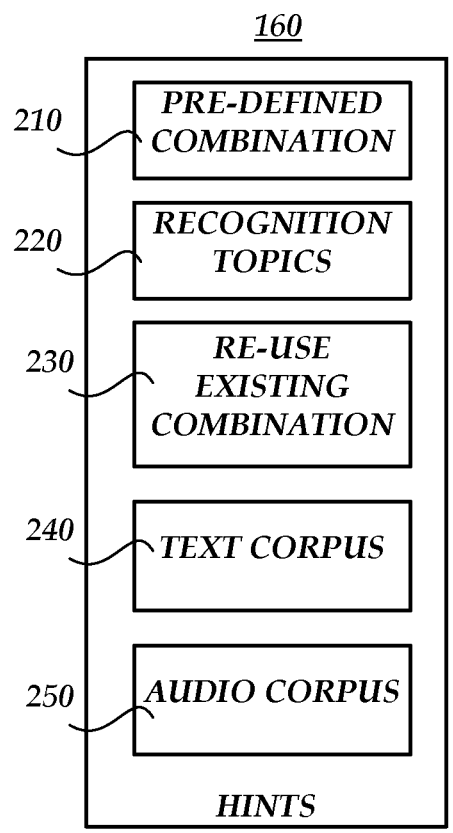
FIG. 2 is a block diagram illustrating various hints which may be utilized by the system of FIG. 1, in accordance with an embodiment.

FIG. 2 is a block diagram illustrating various hints 160, which may be utilized by the system 100 of FIG. 1, in accordance with an embodiment. The hints 160 may comprise a pre-defined combination hint 210, a recognition topics hint 220, a re-use existing combination hint 230, a text corpus hint 240 and an audio corpus hint 250. The pre-defined combination hint 210 may comprise pre-defined selections (e.g., by an application developer) of LM components (e.g., the LM components 120) that cover wide domains such as voice search, short message dictation, etc. The pre-defined selections may comprise, for example, a pre-compiled language model or an existing fixed weight combination of LM components for "on-the-fly" component interpolation by the recognition service provider 102.

The recognition topics hint 220 may comprise a manual selection of one or more topics/styles from a pre-compiled list of available items corresponding to the LM components 120. For example, if the LM components include Shopping, Games, Music, Movies, etc., then the pre-compiled list may include items corresponding to LM components selected by an application developer determined to be relevant to a particular speech recognition application (e.g., Games, Movies and Music for a gaming console). As discussed above, in some embodiments, the LM components may also be provided with weights by the application developer. It should be appreciated that after the recognition service provider 102 receives the recognition topics hint 220, the recognition service provider 102 may interpolate the selected LM components with the provided weights upon receiving a recognition request from the application 170.

The re-use existing combination hint 230 may reference the re-use of an existing scenario-specific combination of LM components. For example, an application developer may already have an existing recognition application for which a combination of LM components has been previously optimized. In response to the re-use existing combination hint 230, the same combination may be re-used for a new but similar scenario by the recognition service provider 102.

The text corpus hint 240 may comprise an in-domain text corpus for the system 100 to learn optimal LM component interpolating coefficients with respect to the corpus. For example, if an application developer provides a collection of software-related transcripts, the resultant language model may be expected to handle software-related audio requests. Those skilled in the art should appreciate that techniques such as an Expectation Maximization algorithm may be utilized to optimize LM component weight vectors with respect to the corpus. It should be understood that in contrast to the hints 210-230 discussed above, the text corpus hint 240 (as well as the audio corpus hint 250 discussed below) are implicit hints.

The audio corpus hint 250 may comprise an in-domain audio corpus for the system 100 to learn optimal LM component interpolating coefficients with respect to the corpus. It should be understood that, in an embodiment, a larger number of samples may be needed than samples needed for the in-domain text corpus in order to achieve similar recognition accuracy.

Figure 3:
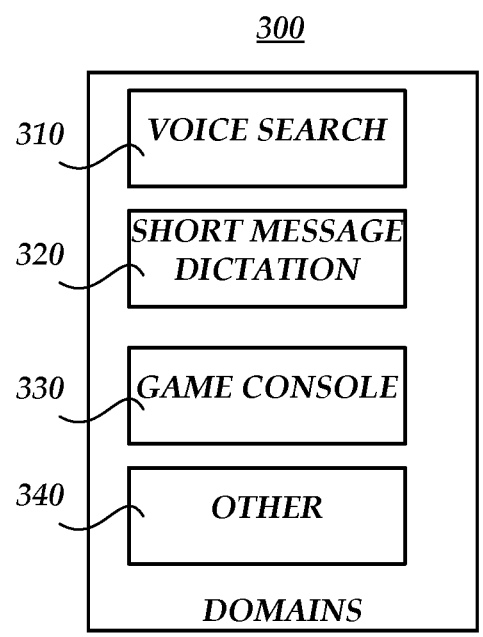
FIG. 3 is a block diagram illustrating various domains which may be utilized in the system of FIG. 1, in accordance with an embodiment.

FIG. 3 is a block diagram illustrating various domains 300 which may be utilized in the system 100 of FIG. 1, in accordance with an embodiment. The domains 300 may include wide domains such as voice search domain 310 and short message dictation domain 320. The domains 300 may also include narrow domains such as game console domain 330. In some embodiments, the application 170 may be configured to assign intuitive domain names (e.g., "XBOX domain") for designating LM component combinations. The domains 300 may also include other domains 340 which may comprise wide or narrow domains in addition to those identified above.

Figure 4:
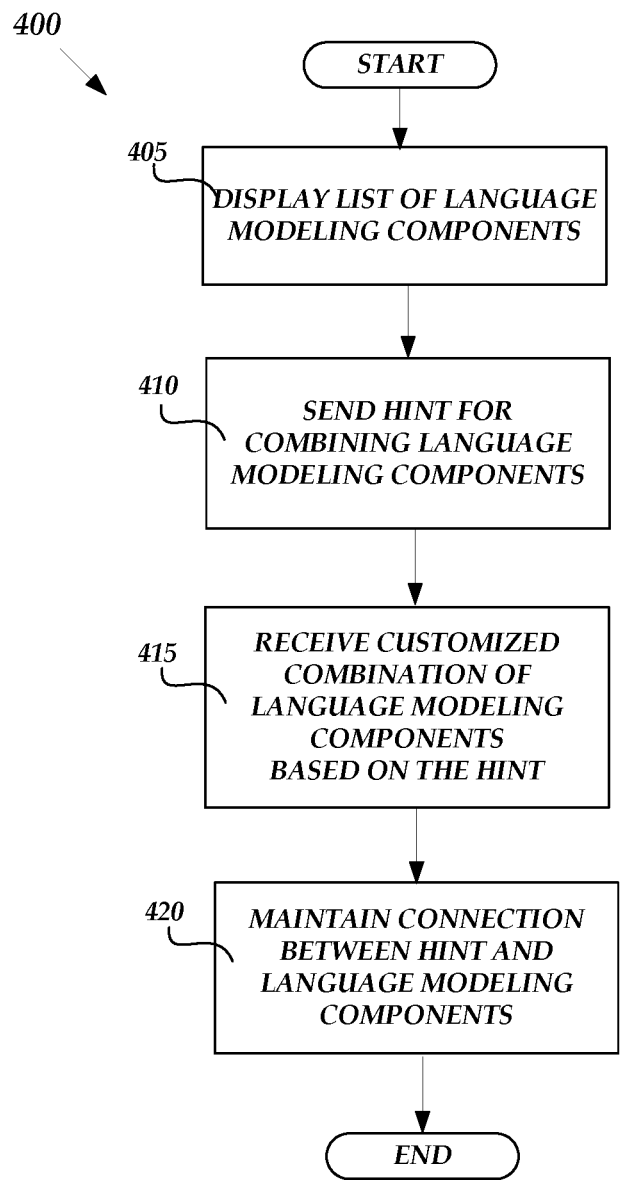
FIG. 4 is a flow diagram illustrating a routine for customizing language modeling components for speech recognition, in accordance with an embodiment.

FIG. 4 is a flow diagram illustrating a routine 400 for customizing language modeling components for speech recognition, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 4 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 400 begins at operation 405, where the application 170 executing on the computing device 150 may present a list of language modeling (LM) components for selection by a user (e.g., an application developer). In various embodiments, the list may be displayed in the user interface 155 or, alternatively, provided to the application developer via programmatic access. For example, the list may comprise the LM component list 165 described above with respect to FIG. 1.

From operation 405, the routine 400 continues to operation 410, where the application 170 executing on the computing device 150 may send a hint 160 for combining selected LM components from the list. The hint 160 may be based on one or more of the domains 300. For example, in one embodiment, the hint 160 may comprise a selection of a pre-compiled language model (e.g., the pre-compiled component combination 110) which is based on one or more domains. In another embodiment, the hint 160 may comprise a selection of a fixed weight combination of LM components (e.g., the fixed weight component combination 114) based on one or more domains. In yet another embodiment, the hint 160 may comprise a selection of one or more recognition topics (from a pre-compiled list) corresponding to one or more of the LM components (e.g., he topic-based combination 112). As discussed above with respect to FIG. 1, one or more weights 130 may also be applied to the LM components. In yet another embodiment, the hint 160 may comprise an in-domain text corpus or an in-domain audio corpus as described above with respect to FIG. 2. In yet another embodiment, the hint 160 may comprise an existing combination of LM components for re-use. It should be understood the in one embodiment, the hints 160 may be sent with a recognition request to the recognition service provider 102 by the application 170. In another embodiment, the hints 160 may be sent to the recognition service provider 102 prior to sending recognition requests as part of an offline initialization process. For example, an application developer may submit a hint 160 prior to launching an application as part of a registration process thereby providing the recognition service provider 102 with enough time to process the hint 160. It should be appreciated that implicit hints such as the in-domain text corpus and the in-domain audio corpus (discussed above), may be submitted in this fashion.

From operation 410, the routine 400 continues to operation 415, where the application 170 executing on the computing device 150 may receive a customized combination of LM components based on the hint 160. In particular, the computing device 150 may receive a language model (e.g., one of language models 105) customized by the recognition service provider 102 based on the guidance received in the hint 160.

From operation 415, the routine 400 continues to operation 420, where the application 170 executing on the computing device 150 may maintain a connection between a submitted hint 160 and associated LM components. For example, the application 170 may be configured to maintain a stable connect between hints comprising manually chosen topics by an application developer and the life cycle of a corresponding LM combination or language model customized by the recognition service provider 102. In particular, and in accordance with an embodiment, an application developer may be provided with a unique ID that may be utilized to reference a particular customized language model used for recognition in accordance with a particular scenario (or comparable scenario) identified by the application developer. It should be understood that the aforementioned approach may be applied at various granularity levels including, but not limited to, per-domain, per-scenario, per-application, per application field and per application user, as well as combinations thereof. From operation 415, the routine 400 then ends.

Figure 5:
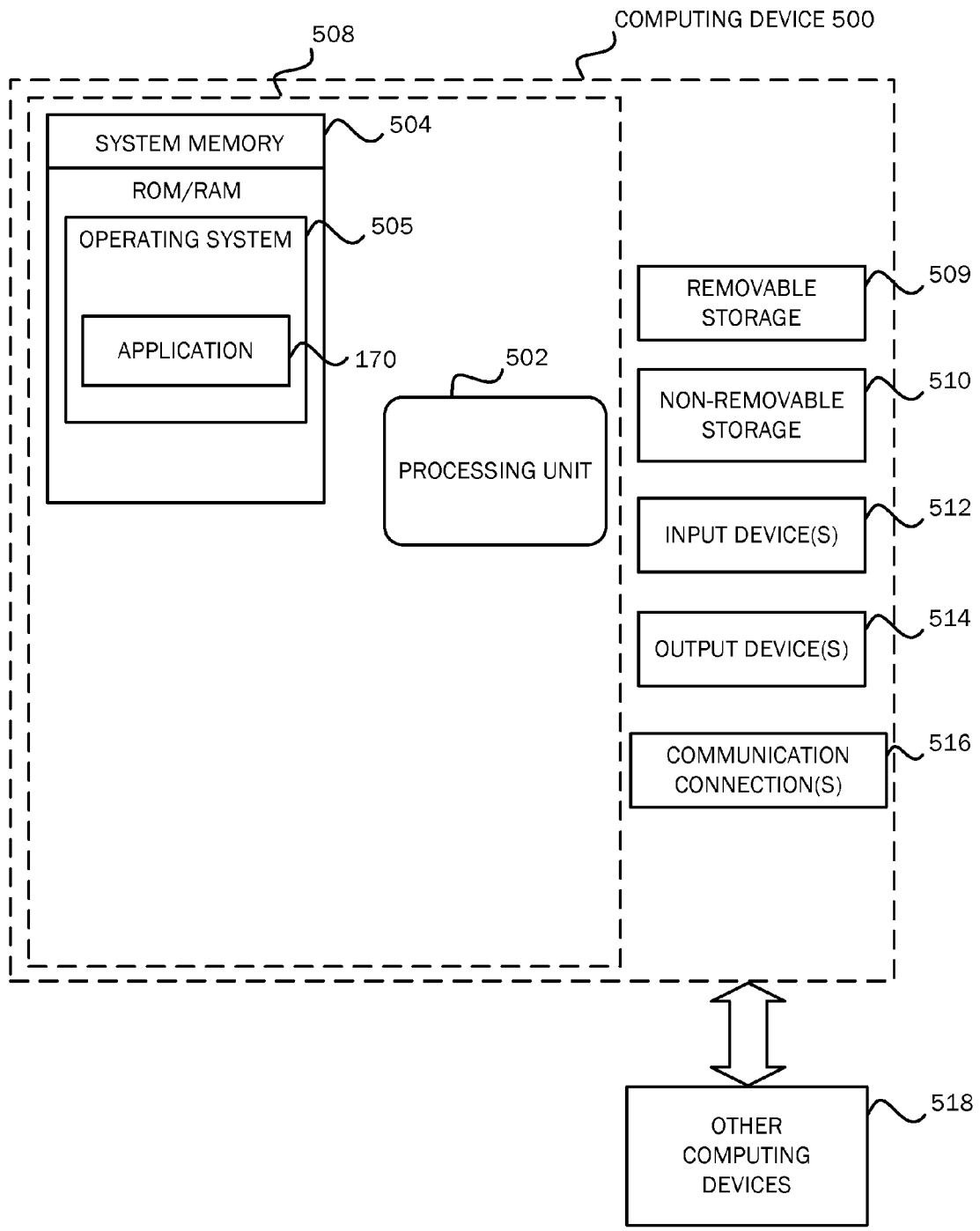
FIG. 5 is a simplified block diagram of a computing device with which various embodiments may be practiced.
Figure 6A:
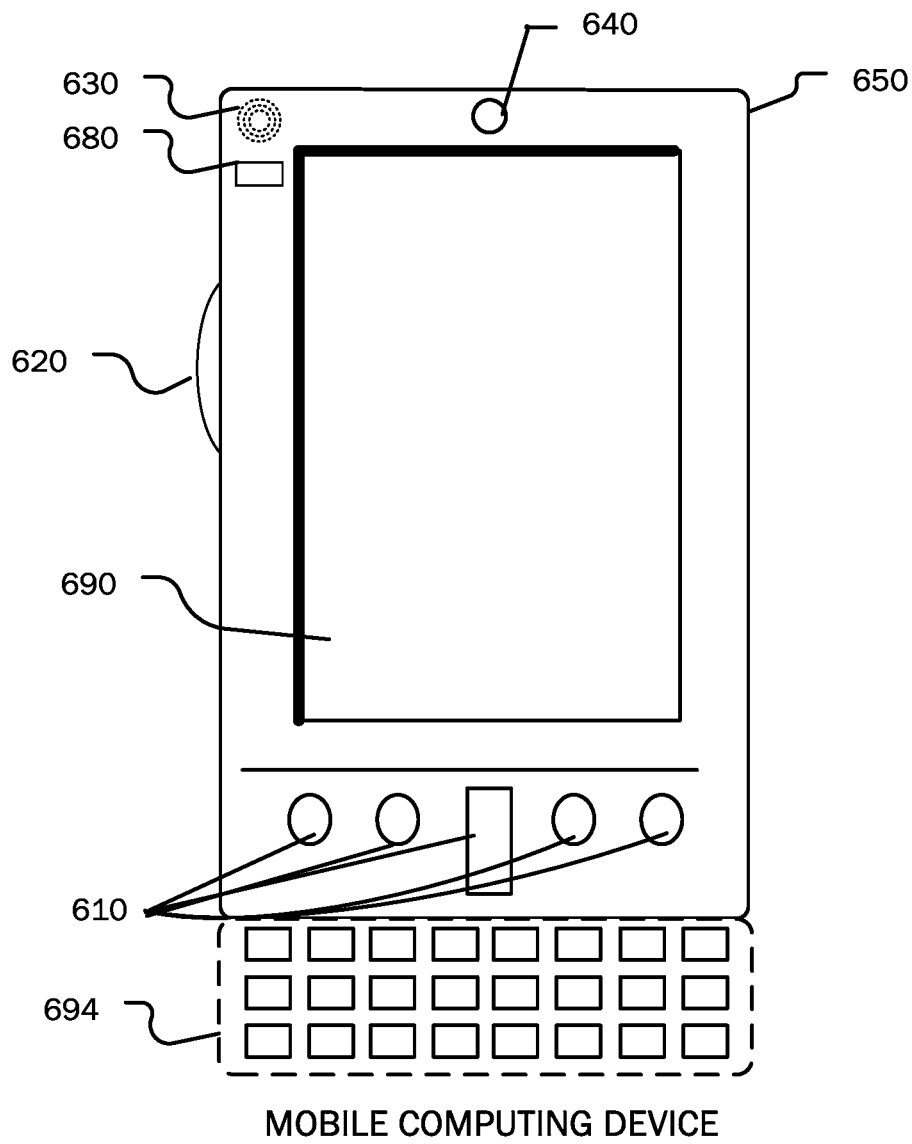
FIG. 6A is a simplified block diagram of a mobile computing device with which various embodiments may be practiced.
Figure 6B:
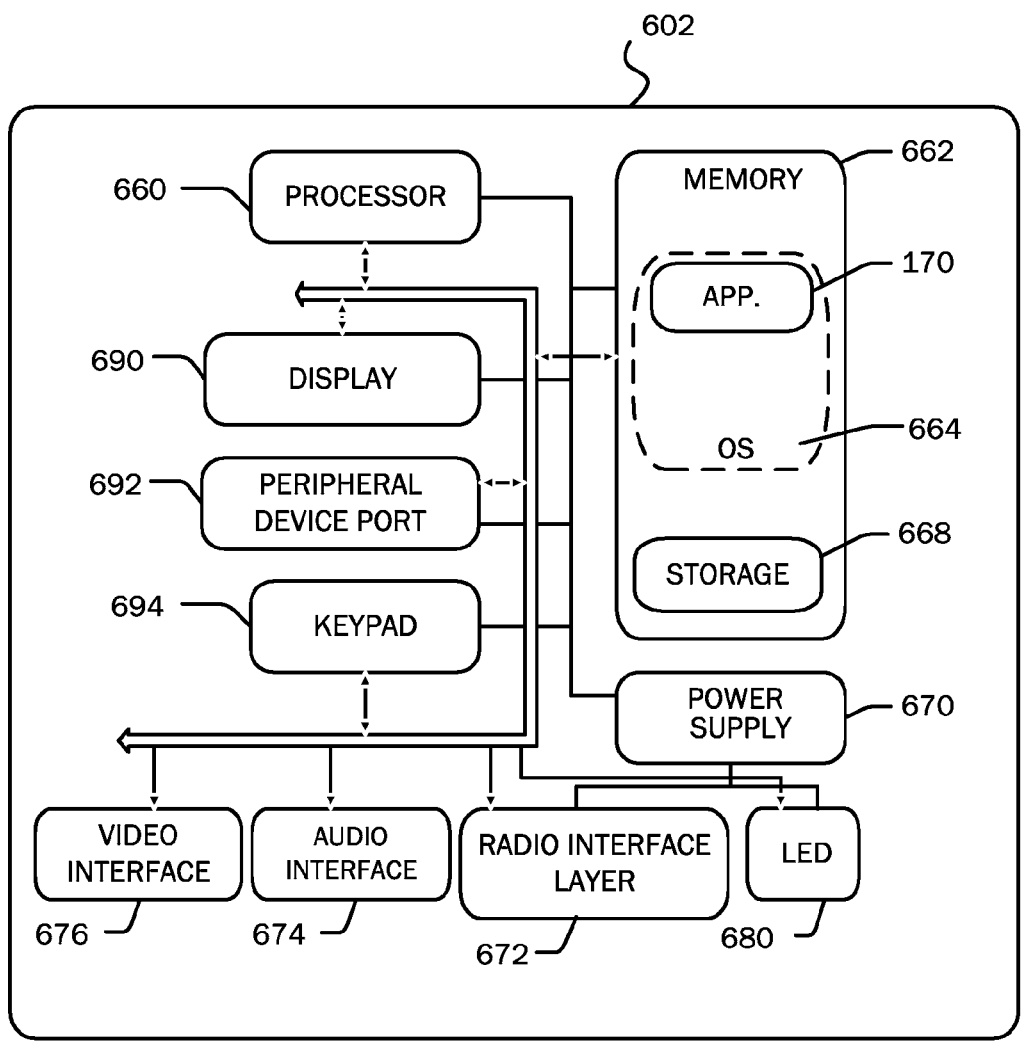
FIG. 6B is a simplified block diagram of a mobile computing device with which various embodiments may be practiced.
Figure 7:
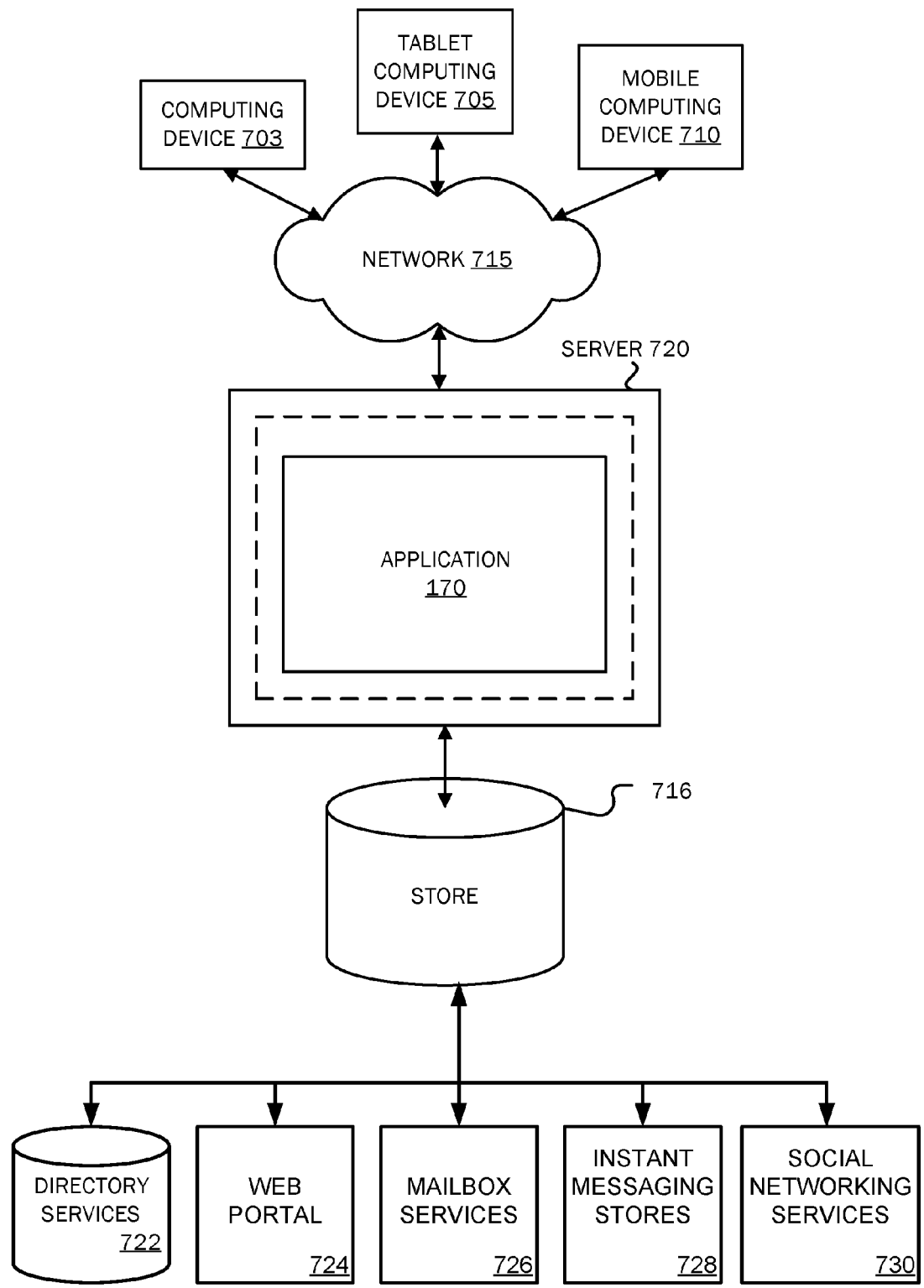
FIG. 7 is a simplified block diagram of a distributed computing system in which various embodiments may be practiced.

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 500 with which various embodiments may be practiced. In a basic configuration, the computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and application 170. Operating system 505, for example, may be suitable for controlling the computing device 500's operation and, in accordance with an embodiment, may comprise the WINDOWS operating systems from MICROSOFT CORPORATION of Redmond, Wash. The application 170 (which, in some embodiments, may be included in the operating system 505) may comprise functionality for performing routines including, for example, customizing language modeling components, as described above with respect to the operations in routine 400 of FIG. 4.

The computing device 500 may have additional features or functionality. For example, the computing device 500 may also include additional data storage devices (removable and/or non-removable) such as, for example, magnetic disks, optical disks, solid state storage devices ("SSD"), flash memory or tape. Such additional storage is illustrated in FIG. 5 by a removable storage 509 and a non-removable storage 510. The computing device 500 may also have input device(s) 512 such as a keyboard, a mouse, a pen, a sound input device (e.g., a microphone), a touch input device for receiving gestures, an accelerometer or rotational sensor, etc. Output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 500 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile computing device 650 which may include, without limitation, a smartphone, a tablet personal computer, a laptop computer and the like, with which various embodiments may be practiced. With reference to FIG. 6A, an example mobile computing device 650 for implementing the embodiments is illustrated. In a basic configuration, mobile computing device 650 is a handheld computer having both input elements and output elements. Input elements may include touch screen display 625 and input buttons 610 that allow the user to enter information into mobile computing device 650. Mobile computing device 650 may also incorporate an optional side input element 620 allowing further user input. Optional side input element 620 may be a rotary switch, a button, or any other type of manual input element. In alternative embodiments, mobile computing device 650 may incorporate more or less input elements. In yet another alternative embodiment, the mobile computing device is a portable telephone system, such as a cellular phone having display 625 and input buttons 610. Mobile computing device 650 may also include an optional keypad 605. Optional keypad 605 may be a physical keypad or a "soft" keypad generated on the touch screen display.

Mobile computing device 650 incorporates output elements, such as display 625, which can display a graphical user interface (GUI). Other output elements include speaker 630 and LED 680. Additionally, mobile computing device 650 may incorporate a vibration module (not shown), which causes mobile computing device 650 to vibrate to notify the user of an event. In yet another embodiment, mobile computing device 650 may incorporate a headphone jack (not shown) for providing another means of providing output signals.

Although described herein in combination with mobile computing device 650, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 6B is a block diagram illustrating components of a mobile computing device used in one embodiment, such as the mobile computing device 650 shown in FIG. 6A. That is, mobile computing device 650 can incorporate a system 602 to implement some embodiments. For example, system 602 can be used in implementing a "smartphone" that can run one or more applications similar to those of a desktop or notebook computer. In some embodiments, the system 602 is integrated as a computing device, such as an integrated personal digital assistant (PDA) and wireless phone.

Application 170 may be loaded into memory 662 and run on or in association with an operating system 664. The system 602 also includes non-volatile storage 668 within memory the 662. Non-volatile storage 668 may be used to store persistent information that should not be lost if system 602 is powered down. The application 170 may use and store information in the non-volatile storage 668. The application 170, for example, may comprise functionality for performing routines including, for example, customizing language modeling components, as described above with respect to the operations in routine 400 of FIG. 4. A synchronization application (not shown) also resides on system 602 and is programmed to interact with a corresponding synchronization application resident on a host computer to keep the information stored in the non-volatile storage 668 synchronized with corresponding information stored at the host computer. As should be appreciated, other applications may also be loaded into the memory 662 and run on the mobile computing device 650.

The system 602 has a power supply 670, which may be implemented as one or more batteries. The power supply 670 might further include an external power source, such as an AC adapter or a powered docking cradle that supplements or recharges the batteries.

The system 602 may also include a radio 672 (i.e., radio interface layer) that performs the function of transmitting and receiving radio frequency communications. The radio 672 facilitates wireless connectivity between the system 602 and the "outside world," via a communications carrier or service provider. Transmissions to and from the radio 672 are conducted under control of OS 664. In other words, communications received by the radio 672 may be disseminated to the application 170 via OS 664, and vice versa.

The radio 672 allows the system 602 to communicate with other computing devices, such as over a network. The radio 672 is one example of communication media. The embodiment of the system 602 is shown with two types of notification output devices: the LED 680 that can be used to provide visual notifications and an audio interface 674 that can be used with speaker 630 to provide audio notifications. These devices may be directly coupled to the power supply 670 so that when activated, they remain on for a duration dictated by the notification mechanism even though processor 660 and other components might shut down for conserving battery power. The LED 680 may be programmed to remain on indefinitely until the user takes action to indicate the powered-on status of the device. The audio interface 674 is used to provide audible signals to and receive audible signals from the user. For example, in addition to being coupled to speaker 630, the audio interface 674 may also be coupled to a microphone (not shown) to receive audible (e.g., voice) input, such as to facilitate a telephone conversation. In accordance with embodiments, the microphone may also serve as an audio sensor to facilitate control of notifications. The system 602 may further include a video interface 676 that enables an operation of on-board camera 640 to record still images, video streams, and the like.

A mobile computing device implementing the system 602 may have additional features or functionality. For example, the device may also include additional data storage devices (removable and/or non-removable) such as, magnetic disks, optical disks, or tape. Such additional storage is illustrated in FIG. 6B by storage 668.

Data/information generated or captured by the mobile computing device 650 and stored via the system 602 may be stored locally on the mobile computing device 650, as described above, or the data may be stored on any number of storage media that may be accessed by the device via the radio 672 or via a wired connection between the mobile computing device 650 and a separate computing device associated with the mobile computing device 650, for example, a server computer in a distributed computing network such as the Internet. As should be appreciated such data/information may be accessed via the mobile computing device 650 via the radio 672 or via a distributed computing network. Similarly, such data/information may be readily transferred between computing devices for storage and use according to well-known data/information transfer and storage means, including electronic mail and collaborative data/information sharing systems.

FIG. 7 is a simplified block diagram of a distributed computing system in which various embodiments may be practiced. The distributed computing system may include number of client devices such as a computing device 703, a tablet computing device 705 and a mobile computing device 710. The client devices 703, 705 and 710 may be in communication with a distributed computing network 715 (e.g., the Internet). A server 720 is in communication with the client devices 703, 705 and 710 over the network 715. The server 720 may store application 170 which may be perform routines including, for example, customizing language modeling components, as described above with respect to the operations in routine 400 of FIG. 4.

Content developed, interacted with, or edited in association with the application 170 may be stored in different communication channels or other storage types. For example, various documents may be stored using a directory service 722, a web portal 724, a mailbox service 726, an instant messaging store 728, or a social networking site 730. The application 170 may use any of these types of systems or the like for enabling data utilization, as described herein. The server 720 may provide the proximity application 170 to clients. As one example, the server 720 may be a web server providing the application 170 over the web. The server 720 may provide the application 170 over the web to clients through the network 715. By way of example, the computing device 10 may be implemented as the computing device 703 and embodied in a personal computer, the tablet computing device 705 and/or the mobile computing device 710 (e.g., a smart phone). Any of these embodiments of the computing devices 703, 705 and 710 may obtain content from the store 716.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method, executed by a computing device, of customizing language modeling components, the method comprising:
    displaying, by the computing device, a list of language modeling components;
    sending, by the computing device to a service provider, a hint for combining a plurality of the language modeling components from the list, the hint being based on one or more of a plurality of domains, wherein sending the hint for combining a plurality of the language modeling components from the list comprises sending the hint prior to initiating an offline initialization process; and
    receiving, by the computing device from the service provider, a customized combination of the plurality of the language modeling components based on the hint;
    capturing speech input; and
    recognizing the captured speech input based on the received customized combination of the plurality of the language modeling components.

2. The method of claim 1, further comprising maintaining a connection between the hint and the one or more of the plurality of the language modeling components by assigning an ID associated with the hint to the plurality of language modeling components.

3. The method of claim 1, wherein sending, by the computing device, the hint for combining a plurality of the language modeling components from the list comprises sending a selection of a pre-compiled language model based on the one or more of the plurality of domains.

4. The method of claim 1, wherein sending, by the computing device, the hint for combining a plurality of the language modeling components from the list comprises sending a selection of a fixed weight combination of the plurality of the language modeling components based on the one or more of the plurality of domains.

5. The method of claim 4, further comprising applying one or more weights to the one or more of the plurality of language modeling components.

6. The method of claim 1, wherein sending, by the computing device, the hint for combining a plurality of the language modeling components from the list comprises sending a selection of one or more recognition topics from a pre-complied list, the one or more recognition topics corresponding to one or more of the plurality of the language modeling components.

7. The method of claim 1, wherein sending, by the computing device, the hint for combining a plurality of the language modeling components from the list comprises sending an in-domain text corpus.

8. The method of claim 1, wherein sending, by the computing device, the hint for combining a plurality of the language modeling components from the list comprises sending an in-domain audio corpus.

9. The method of claim 1, wherein sending, by the computing device, the hint for combining a plurality of the language modeling components from the list comprises sending an existing combination of language modeling components for re-use.

10. The method of claim 1, wherein sending, by the computing device, the hint for combining a plurality of the language modeling components from the list comprises sending a recognition request comprising the hint.

11. A system for customizing language modeling components, comprising:
    a memory for storing executable program code; and
    a processor, functionally coupled to the memory, the processor being responsive to computer-executable instructions contained in the program code and operative to:
        display, by the system, a list of language modeling components;
        send, by the system to a service provider, a hint generated by the system for combining a plurality of language modeling components from the list, the hint being based on one or more of a plurality of domains;
        receive, by the system from the service provider, a customized combination of the plurality of the language modeling components based on the hint;
        maintain a connection between the hint and the one or more of the plurality of the language modeling components by assigning an ID associated with the hint to the plurality of language modeling components;
        receive speech input into the system; and
        recognize the speech input based on the customized combination of the plurality of the language modeling components.

12. The system of 11, wherein the processor, in sending the hint for combining a plurality of the language modeling components from the list, is operative to send a selection of a pre-compiled language model based on the one or more of the plurality of domains.

13. The system of claim 11, wherein the processor, in sending the hint for combining a plurality of the language modeling components from the list, is operative to send a selection of a fixed weight combination of the plurality of the language modeling components based on the one or more of the plurality of domains.

14. The system of claim 11, wherein the processor, in sending the hint for combining a plurality of the language modeling components from the list, is operative to:
    send a selection of one or more recognition topics from a pre-complied list, the one or more recognition topics corresponding to one or more of the plurality of the language modeling components; and
    apply one or more weights to the one or more of the plurality of language modeling components.

15. A computer-implemented method of customizing language modeling components, comprising:
    receiving an identification of one or more language modeling components from a client device for use in recognizing speech;
    receiving a selection of a weight value for the selected one or more of the language modeling components; and
    generating a customized combination of language modeling components for speech recognition based on the identified one or more language modeling components and the weight value;
    sending the customized combination of language modeling components to the client device to recognize speech based on the customized combination of language modeling components;
    receiving speech input; and
    recognizing the speech input based on the customized combination of the plurality of the language modeling components.

16. The method of claim 15, wherein the information received includes at least a portion of an in-domain text corpus.

17. The method of claim 15, wherein the information received includes at least a portion of an in-domain audio corpus.

18. The method of claim 15, wherein the information received identifies at least an existing combination of language modeling components for re-use.

19. The method of claim 15, wherein the information is received as part of a recognition request for use in on-the-fly language model interpolation.

20. The method of claim 15, further comprising recognizing speech based on the customized combination of language modeling components.

\* \* \* \* \*